(12) United States Patent (10) Patent No.: US 8,578,454 B2
Grim (45) Date of Patent: Nov. 5, 2013

(54) TWO-FACTOR AUTHENTICATION SYSTEMS AND METHODS

(71) Applicant: Toopher, Inc., Austin, TX (US)

(72) Inventor: Evan Tyler Grim, Austin, TX (US)

(73) Assignee: Toopher, Inc., Austin, TX (US)

( * ) Notice: Subject to any disclaimer, the term of this patent is extended or adjusted under 35 U.S.C. 154(b) by 0 days.

(21) Appl. No.: 13/660,976

(22) Filed: Oct. 25, 2012

(65) Prior Publication Data

US 2013/0104198 A1  Apr. 25, 2013

Related U.S. Application Data

(60) Provisional application No. 61/551,370, filed on Oct. 25, 2011, provisional application No. 61/609,824, filed on Mar. 12, 2012, provisional application No. 61/693,690, filed on Aug. 27, 2012.

(51) Int. Cl.
H04L 29/06 (2006.01)

(52) U.S. Cl.
USPC ............. 726/4; 726/2; 726/3; 726/5; 726/6; 726/7; 713/168; 713/169; 713/170; 713/171; 713/172

(58) Field of Classification Search
USPC .......................................................... 726/4
See application file for complete search history.

(56) References Cited

U.S. PATENT DOCUMENTS

| 5,963,646 | A | 10/1999 | Fielder et al. |
| 5,995,624 | A | 11/1999 | Fielder et al. |
| 6,049,612 | A | 4/2000 | Fielder et al. |
| 6,105,133 | A | 8/2000 | Fielder et al. |
| 7,104,444 | B2 | 9/2006 | Suzuki |
| 7,548,886 | B2 | 6/2009 | Kirkland |
| 7,669,760 | B1 | 3/2010 | Zettner |
| 7,801,304 | B1 | 9/2010 | Harvey |
| 7,805,749 | B1 | 9/2010 | Harvey |
| 7,860,131 | B1 | 12/2010 | Harvey |
| 7,908,638 | B1 | 3/2011 | Harvey |
| 2003/0182194 | A1 | 9/2003 | Choey |
| 2006/0136334 | A1 | 6/2006 | Atkinson et al. |
| 2007/0055878 | A1 | 3/2007 | Sandhu et al. |
| 2007/0174082 | A1 | 7/2007 | Singh |
| 2010/0006642 | A1 | 1/2010 | Boutcher |
| 2010/0100454 | A1 | 4/2010 | Sines |
| 2010/0174649 | A1 | 7/2010 | Bouchard |

(Continued)

OTHER PUBLICATIONS

International Search Report and Written Opinion of International Application No. PCT/US2012/061999 mailed Feb. 13, 2013.

*Primary Examiner* — Longbit Chai
(74) *Attorney, Agent, or Firm* — Koppel, Patrick, Heybl & Philpott

(57) ABSTRACT

Systems and methods for authenticating defined user actions over a computer network. An authentication service receives an authentication request from an authenticating service to perform an action on behalf of a user. The authentication service then sends a permission request to a mobile device associated with the user, asking the user whether or not the action should be allowed. The user sends a permission response via the mobile device to the authentication service, granting or denying the action. The user may automate future similar responses so long as at least one automation criterion is met (e.g., the physical location of the mobile device), eliminating the need to manually provide a response to future permission requests. Information necessary to determine whether the automation criterion is met is stored locally on the mobile device.

19 Claims, 4 Drawing Sheets

(56) References Cited

U.S. PATENT DOCUMENTS

| | | |
|---|---|---|
| 2010/0217880 A1 | 8/2010 | Venezia et al. |
| 2010/0293598 A1 | 11/2010 | Collart et al. |
| 2010/0299529 A1 | 11/2010 | Fielder |
| 2011/0202466 A1 | 8/2011 | Carter |
| 2011/0307699 A1 | 12/2011 | Fielder |
| 2011/0307705 A1 | 12/2011 | Fielder |
| 2011/0307706 A1 | 12/2011 | Fielder |
| 2011/0307707 A1 | 12/2011 | Fielder |
| 2011/0314281 A1 | 12/2011 | Fielder |
| 2012/0280784 A1* | 11/2012 | Gaviria Velez et al. ........ 340/5.7 |

* cited by examiner

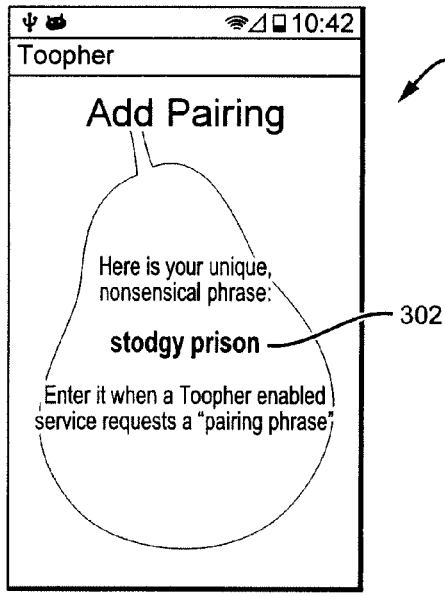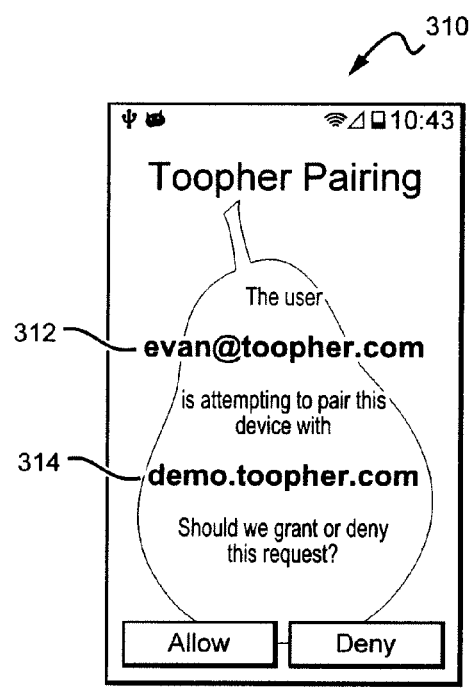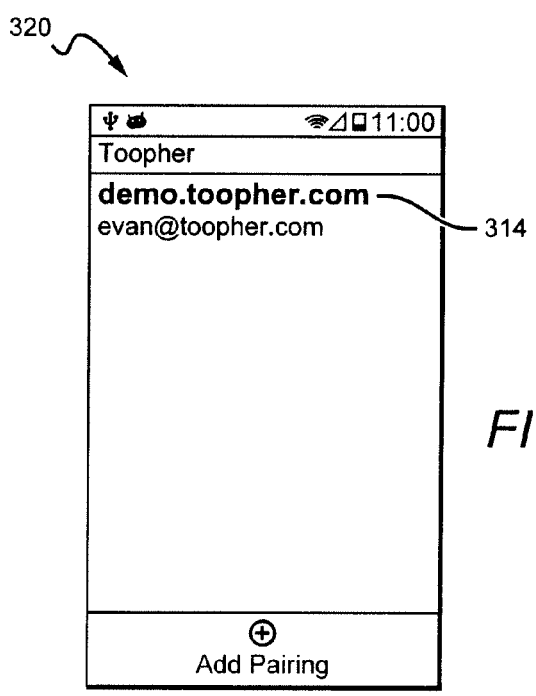
FIG. 3a
FIG. 3b
FIG. 3c

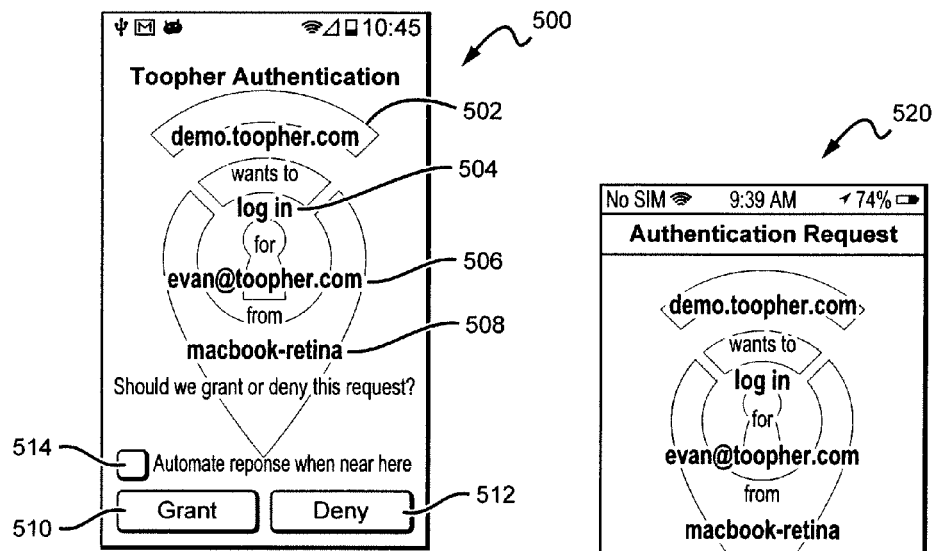
FIG. 5a
FIG. 5b
FIG. 6
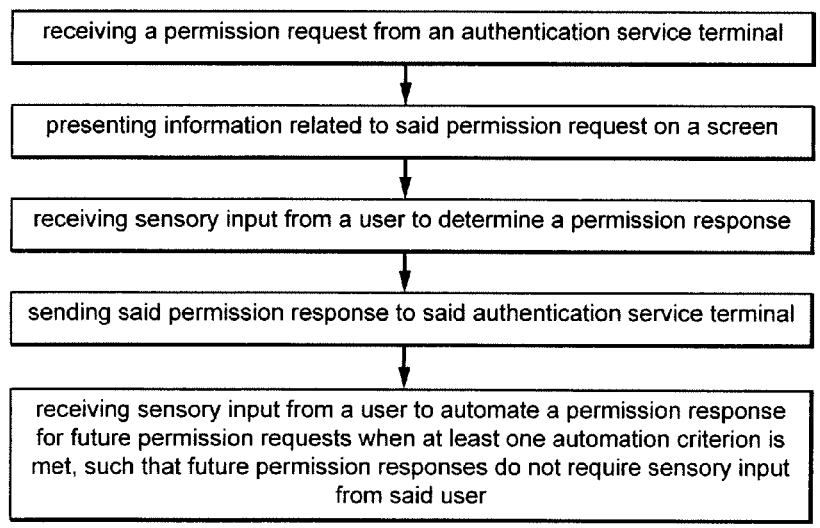

TWO-FACTOR AUTHENTICATION SYSTEMS AND METHODS

This application claims the benefit of U.S. Provisional Application No. 61/551,370, filed 25 Oct. 2011, U.S. Provisional Application No. 61/609,824, filed 12 Mar. 2012, and U.S. Provisional Application No. 61/693,690, filed 27 Aug. 2012.

BACKGROUND OF THE INVENTION

1. Field of the Invention

Embodiments of the present invention relate to systems and methods of authentication, and more specifically, to such systems and methods using geo-location tools in mobile devices.

2. Description of the Related Art

The security community has long sought a viable second factor to supplement and fortify passwords as a means for user authentication. Previous attempts have been hamstrung by solutions that are too expensive and cumbersome to enjoy mainstream adoption.

Much to the chagrin of the security community, passwords have stubbornly remained the only authentication mechanism in place for the vast majority of user accounts. This is largely due to the simplicity and ease of use that passwords provide account holders. However, when used as the sole factor for authentication, passwords present a litany of issues: they are often either hard to remember or easy to guess; users tend to reuse their passwords with many accounts; they are often stored insecurely both at the client and the server . . . the list goes on and on. The consensus has long held that there is a compelling need for an additional mechanism that can supplement and fortify this irksome first factor. A multitude of solutions have been proposed over the years, all promising to provide this much needed second factor — but for various reasons none have found widespread adoption beyond a relatively small niche user-base. The larger world of mainstream users remains unprotected and would greatly benefit from a solution that does not extensively affect existing authentication routines.

Recently, some two-factor authentication (TFA) mechanisms have been used; however, none of these known solutions are ideal. Many TFA mechanisms in current use center around the use of a security token. In this scheme, users are issued a token, often a small hardware device with a screen which displays a seemingly random number that changes periodically. Users that have paired a token with a network resource must supply the number currently on the screen at any given moment as part of the login procedure (in addition to a static password, the first authentication factor). If the provided code matches an expected value at a token-aware backend for a given instance, then the system grants the authentication request — feeling confident that a request that can provide a password (something known) and a valid code from the token screen (something possessed) is reasonably likely to be an authentic request. Security schemes using hardware tokens have been relatively successful as a two-factor authentication mechanism; however these schemes have been limited almost exclusively to environments where use is mandated (e.g., required for login to a corporate VPN, etc.). The lack of widespread adoption outside these mandatory use environments may be attributable to two primary barriers to entry: the significant infrastructure required to implement such systems (e.g., complicated backend servers, hardware costs, etc.); and the inconvenience to a user in having to retrieve a token and transcribe a code every time a login is required.

More recent solutions have mitigated some of the daunting infrastructure requirements, such as the TFA mechanisms deployed by companies such as Facebook and Google. These kind of mechanisms provide software based tokens that reside on the mobile devices that many of their users already carry on their person. However, these systems still require the user to retrieve his/her mobile device, launch the required application, and transcribe the code currently displayed on the mobile device screen. Many users find this solution to be cumbersome and irritating.

Some other recent solutions use location awareness of a mobile device as a part of a larger authentication process; however, these approaches require the transmission of a user's location or other identifying information to a central server. This raises privacy concerns for users where large amounts of personal data (e.g., daily travel habits) are stored on a third party server where the data may not be secure.

Other location based approaches require a priori or on-demand location awareness for terminal devices attempting the authentication.

Thus, there is a need for a system that achieves TFA without significantly burdening the user while, at the same, time eliminating the need for complicated infrastructure implementations.

SUMMARY OF THE INVENTION

One embodiment of a method of authentication comprises the following steps. An authentication request is received from an authenticating service to perform an action on behalf of a user. A permission request is sent to a mobile device associated with the user to grant or deny permission to perform the action. A permission response is sent to the authenticating service. The user is provided with an option to automate the permission response, wherein future permission requests meet at least one automation criterion.

One embodiment of a system for authentication comprises the following elements. At least one processor and at least one memory element storing instructions for controlling the at least one processor to perform steps comprising the following. An authentication request is received from an authenticating service to perform an action on behalf of a user. A permission request is sent to a mobile device associated with the user to grant or deny permission to perform the action. A permission response is sent to the authenticating service. The user is provided with an option to automate the permission response, wherein future permission requests meet at least one automation criterion. The permission response is automated to automatically generate future permission requests without prompting the user to grant or deny the future permission requests if the user has selected the option to automate.

An embodiment of a non-transitory computer-readable medium including one or more sequences of instructions which, when executed by one or more processors, causes the one or more processors to perform the steps comprising the following. An authentication request is received from an authenticating service to perform an action on behalf of a user. A permission request is sent to a mobile device associated with the user to grant or deny permission to perform the action. A permission response is sent to the authenticating service. The user is provided with an option to automate the permission response, wherein future permission requests meet at least one automation criterion. The permission response to future permission requests is automated without prompting the user to grant or deny the future permission requests if the user has selected the option to automate.

An embodiment of a mobile device for authenticating a permission request from an authenticating service, the mobile device including a processor and operable to perform operations comprising the following. A permission request is received from an authentication service terminal. Information related to said permission request is presented. Sensory input from a user is received to determine a permission response. The permission response is sent to the authentication service terminal. Sensory input from a user is received that selects whether to automate a permission response for future permission requests when at least one automation criterion is met, such that future permission responses do not require sensory input from the user. The information necessary to determine whether the at least one automation criterion is met is stored on the mobile device.

BRIEF DESCRIPTION OF THE DRAWINGS

FIGS. 3a-c show a series of screen shots from an exemplary mobile authenticating device.

FIGS. 5a and 5b show screen shots from a mobile authenticating device.

FIG. 6 shows a flow chart of operations that may be performed by a mobile device for authenticating a permission request.

DETAILED DESCRIPTION OF THE INVENTION

Figure 1:
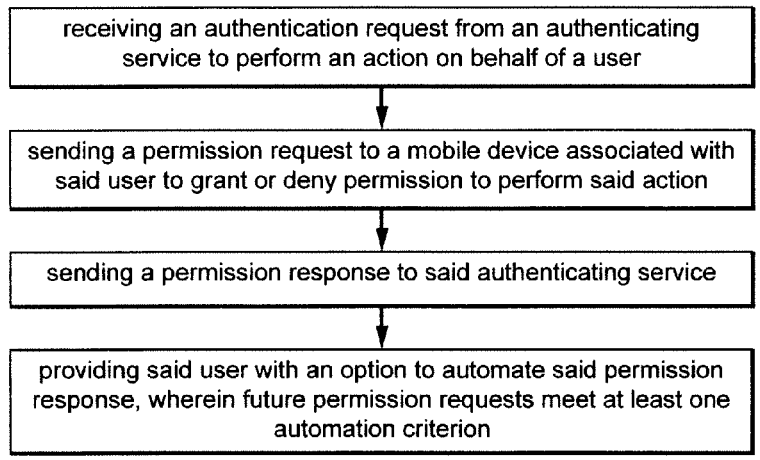
FIG. 1 is flow chart of a method of authentication.

Embodiments of the invention can be implemented in numerous ways, including as a method, a process, an apparatus, a system, a composition of matter, a computer readable medium such as a computer readable storage medium or a computer network wherein program instructions are sent over optical or communication links. A component such as a processor or a memory described as being configured to perform a task includes both general components that are temporarily configured to perform the task at a given time and/or specific components that are manufactured to perform the task. In general, the order of the steps of disclosed methods or processes may be altered within the scope of the invention.

A detailed description of one or more embodiments of the invention is provided below along with accompanying figures that illustrate the principles of operation. Embodiments of the invention are described with particularity, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various aspects will now be described in connection with exemplary embodiments, including certain aspects described in terms of sequences of actions that can be performed by elements of a computer system. For example, it will be recognized that in each of the embodiments, the various actions can be performed by specialized circuits, circuitry (e.g., discrete and/or integrated logic gates interconnected to perform a specialized function), program instructions executed by one or more processors, or by any combination. Thus, the various aspects can be embodied in many different forms, and all such forms are contemplated to be within the scope of what is described. The instructions of a computer program for authenticating a user action can be embodied in any computer-readable medium for use by or in connection with an instruction execution system, apparatus, or device, such as a computer based system, processor containing system, or other system that can fetch the instructions from a computer-readable medium, apparatus, or device and execute the instructions.

As used herein, a "computer-readable medium" can be any means that can contain, store, communicate, propagate, or transport a program for use by or in connection with an instruction execution system, apparatus, or device. The computer-readable medium can be, for example but is not limited to, an electronic, magnetic, optical, electromagnetic, infrared, or semiconductor system, apparatus, device, or propagation medium. More specific examples of the computer readable-medium can include the following: an electrical connection having one or more wires, a portable computer diskette or compact disc read only memory (CD-ROM), a random access memory (RAM), a read only memory (ROM), an erasable programmable read only memory (EPROM or Flash memory), and an optical fiber. Other types of computer-readable media are also contemplated.

Embodiments of the present invention provide systems and methods that provide authentication of defined user actions. This is done by leveraging the network connectivity and location awareness of modern mobile devices (such as smartphones, tablet computers, etc.) to provide an automated and unobtrusive authentication factor, which is typically a second factor of authentication to be used in conjunction with a first factor, for example a username/password login combination.

FIG. 1 is flow chart of a method of authentication according to an embodiment of the present invention. An authentication service receives an authentication request from an authenticating service to perform an action on behalf of a user. The authentication service then sends a permission request to a mobile device associated with the user, asking the user whether or not he wishes to perform the action. The user sends a permission response via the mobile device to the authentication service, granting or denying the action. The user is provided with an option to automate future similar responses so long as at least one automation criterion is met (e.g., the physical location of the mobile device), eliminating the need to manually provide a response to future permission requests. Information necessary to determine whether the automation criterion is met is stored locally on the mobile device.

When an authenticating service (e.g., a web site that requires a login or a car security computer) needs to authenticate a user action, an authentication request is sent to an authentication service. If the authentication request has been sent out by an authenticating service, then ostensibly a first authentication factor has already been provided. In the case of a web site, the first factor is normally a username/password combination. In the example of a car security system, the first authentication factor might be a signal from a key. The authentication method shown in FIG. 1 provides a streamlined process for providing a second factor of authentication to augment the security provided by the first factor. The above-referenced authenticating services are exemplary. Indeed, throughout the specification reference is made to the action of logging on to an exemplary web service; however, it is understood that this is merely one action that may be authenticated using embodiments of the present invention as discussed in more detail herein.

One way in which the process is streamlined is by eliminating the need for repeated authentication grant/deny permission responses by the user. Embodiments of the present invention achieve this by utilizing location awareness technology, a capability that most modern mobile devices already include. Location awareness provides one way to further automate the authentication process and eliminates the need for repeated grant/deny actions, allowing the user's mobile device to remain stowed away in a pocket, a purse, or on a docking station near the user, for example.

This is possible because there is an intuitive pairing between an action, such as logging on to a service for example, and the physical location from which the action is initiated. For instance, a user will typically check his email using a given device from a small subset of places (e.g., home, work, the local coffee shop). When the user attempts to login from a known device when he is at one of these locations, the probability that it is a valid request significantly increases. Thus, these permission responses from familiar locations can be automated by using the authentication application to "teach" the mobile device which types of requests should be automated. Stated differently, the user's mobile device "learns" which authentication requests to automate so that the user does not have to repeatedly perform a grant/deny action to send a permission response.

The learning process can be implemented in several ways. For example, the learning process can be as simple as asking the user if a given authentication request should be automated, or it can involve some additional automation mechanisms to streamline the user experience. For example, the mobile device could be put into a learning mode that automatically grants the authentication requests it receives and stores the locations where the requests were received. The learning process can be implemented in many other ways as well. Once authenticating service, location, and mobile device have been associated (i.e., learned) the system can automatically respond when a similar request is presented in the future without prompting the user for any additional action. The method/system provides a quick and easy way for automation of a robust and unobtrusive second authentication factor.

Figure 2:
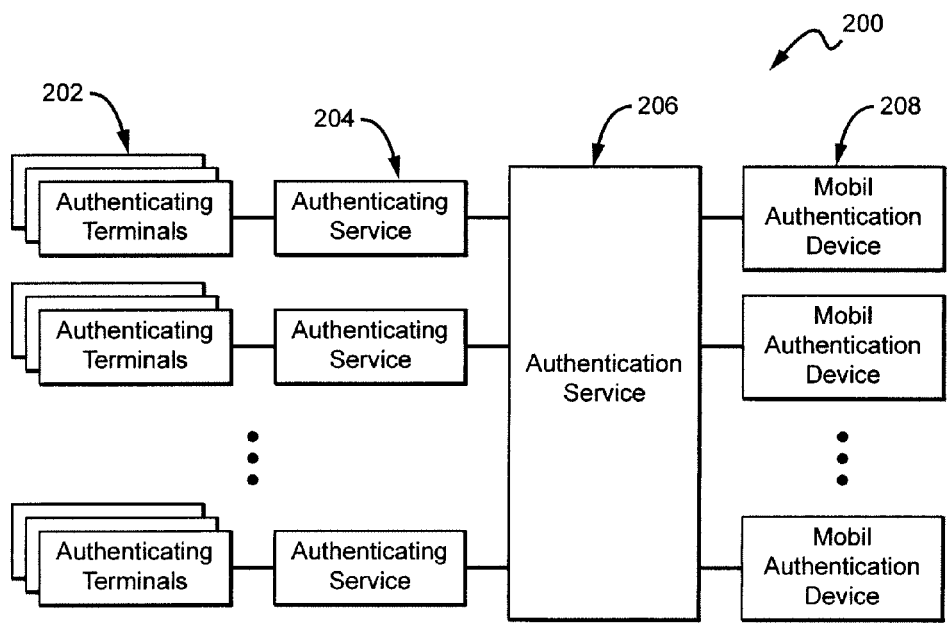
FIG. 2 is a diagram showing an authentication system.

FIG. 2 is a diagram showing an authentication system 200 comprising components according to embodiments of the present invention. A user uses several authenticating terminals 202 (e.g., a home computer, a work computer, a laptop at the coffee shop) to access an authenticating service 204 (e.g., a third party website). Here, a first authentication factor (e.g., a password) is communicated from an authenticating terminal 202 to the authenticating service 204. The authenticating service 204 communicates with the authentication service 206 to verify a user action. This is done by sending a permission request to a mobile authentication device 208 associated with the user. The user uses the mobile device 208 to send a permission response to the authentication service 206 which is passed along to the authenticating service 204, providing the second factor of authentication. Future permission responses may be automated via the mobile device 208. Each of the authenticating terminals 202, the authenticating services 204, and the mobile devices 208 are assigned a universally unique identifier (UUID) that is used to identify it within the authentication service 206.

Embodiments of the methods and systems utilize two key actions: pairing and authentication.

Pairing

In order for a mobile authentication device 208 to authenticate an authenticating service 204, the two first need to be paired together. The pairing process includes the communication of any information that is required for subsequent authentication requests to succeed. For example, if the authenticating service 204 wishes to require one-time-passwords (OTP) to validate authentication requests, the pairing process will establish a shared secret (analogous to an encryption key) between the mobile authentication device 208 and the authenticating service 204. When a subsequent authentication request is made, the mobile authentication device 208 will use this shared secret to generate the OTP, and the authentication will use it to verify that the OTP is correct. The pairing process may require additional information as well (e.g., cryptographical keys, digital signature information, etc.). The pairing process also establishes a unique identifier for the pairing that will be included in future authentication requests. Mobile devices 208 may be configured to discard authentication requests that do not contain a known, valid pairing identifier.

FIGS. 3a-c show a series of screen shots 300, 310, 320 from an exemplary mobile authenticating device 208 running an application of the authentication service 206 an Android operating system. In FIG. 3a, the screen shot 300 shows a pairing phrase 302 which has been generated by the mobile device 208. The pairing phrase is then entered by the user at the authenticating terminal 202. Then the authentication service 206 pushes a pairing request to the mobile device 208 as shown in the screen shot 310 in FIG. 3b. The pairing request includes the user name 312 and the authenticating service name 314 so that the user has the information necessary to verify the pairing before granting it. The screen shot 320 in FIG. 3c shows that the mobile device 208 has successfully paired with the authenticating service 204. The authenticating service name 314 now appears in the paired service list.

Figure 4A:
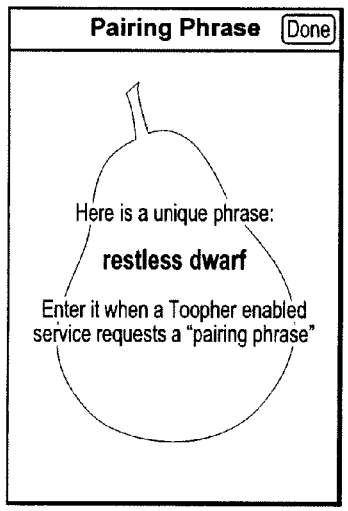
FIGS. 4a-c show a series of screen shots from an exemplary mobile authenticating device.
Figure 4B:
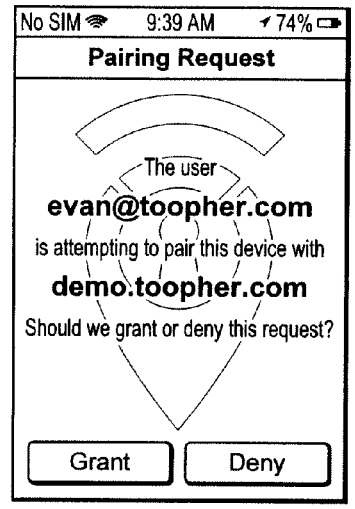
Figure 4C:
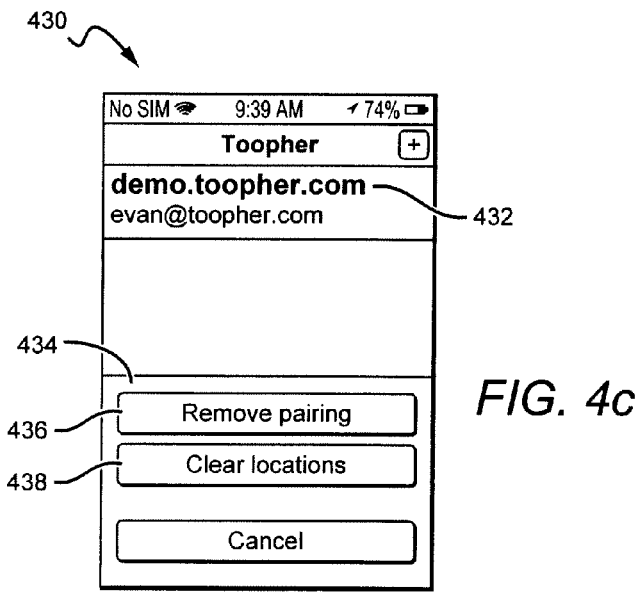

FIGS. 4a-c shows a similar set of screen shots 410, 412, 414 exemplifying the pairing process on an mobile device 208 running an application of the authentication service 206 on an iOS platform. FIG. 4c shows the paired service list where the authenticating service name 432 has been selected. The pop-up dialogue box 434 allows the user to un-pair the mobile device 208 from the authenticating service 204 with the "Remove pairing" button 436 or to clear the pairing list entirely with the "Clear locations" button 438.

Authentication

Authentication is a primary purpose of the methods and systems disclosed herein. After a mobile device 208 has been paired with an authenticating service 206, the actual authentication occurs whenever the authenticating service 206 wishes to verify an action to be performed by a user. This will typically involve receiving an authentication request to do an action at which point the authenticating service 206 must verify the authenticity of the request before communicating to the authenticating service 204 that it is permitted to perform the action. As one possible example, a user may use his laptop to attempt to log in to a web-based email service. Here, the laptop is the authenticating terminal 202 and the web-based email service is the authenticating service 204. The authenticating service 204 will likely, but not necessarily, require the user to present some kind of first factor authenticating information (e.g., a password). Using embodiments of methods and systems disclosed herein, the authenticating service 204 is providing the user with an additional second factor for authentication, and so it then initiates an authentication request through the authentication service 206 and provides the appropriate pairing identifier for the user that is attempting authentication. The authentication service 206 sends a permission request to the appropriate mobile authentication device 208 that responds with permission response as outlined herein.

As previously noted, the permission response can be generated automatically or manually.

In the automated response mode, the mobile authentication device 208 checks an internal database and determines if the authentication request matches at least one automation criterion. There are many options for selecting the criteria for automation, and the mechanism can allow for an authenticating service 204 to flexibly specify an automation policy. In one exemplary embodiment, the authenticating service 204 will allow the user to specify that a certain type of permission request should automatically generate a grant/deny permission response when the mobile authentication device is within a certain proximity of a stored location, and an authentication request is received indicating that it is coming from the same terminal identifier used to originally store that location. This represents an intuitive pairing between the terminals 202 used to log in to an authenticating service 204 and the location of the mobile authentication device 208 when the authentication request is made. If automation is possible, the instruction (grant or deny) is encapsulated in a permission response which is sent to the authentication service 206. This response can optionally include a currently valid OTP to further verify the mobile device 208, along with traditional encryption and digital signature mechanisms.

Additionally, if the request automation latency is critical, the mobile authentication device 208 can pre-seed the permission response when the state of the automation criterion changes to allow the authentication service to respond appropriately without necessarily being required to contact the mobile device on-demand. For example, the criterion automation state can change when the mobile device enters or exits geographic regions where the permission response has been automated. This particular kind of pre-seeding method is known as "geo-fencing." Many other methods may be used to pre-seed an automated permission response.

If the permission request does not match a known automation database entry, the permission response may default to denial, or the mobile device 208 can simply prompt the user for manual entry of the permission response.

Manual generation of the permission response may be used when automation cannot be achieved (e.g., a bad location signal) or is otherwise undesirable. If this is the case, the user will be prompted for the permission response. In addition to requesting the permission response, embodiments of the present invention also include the ability for the user to indicate that similar future requests should receive the same authentication decision (as described above) at the same time the user is prompted for the permission response.

FIGS. 5*a* and 5*b* show screen shots 500, 520 of a mobile device 208 presenting a permission request that requires entry of a manual permission response. The screen shot 500 shows a permission request displayed on mobile device 208 that is running an Android operating system. In this embodiment, the permission request includes a designator of the authenticating service 502, an action description 504, a user name 506, and a terminal description 508. Having been presented with the relevant information to inform an authentication decision, the user may either grant or deny the permission request using the corresponding buttons 510, 512. If the user would like to automate generation of the permission response to similar future permission requests without prompting the user to grant or deny the automate response button 514 may be selected. If automation is activated, the automation database is updated with the location of the mobile authentication device 208 at the time of the permission request which may be used to generate future permission responses.

FIG. 6 shows a flow chart of operations that may be performed by the mobile device 208 for authenticating a permission request according to embodiments of the present invention. The mobile device receives a permission request from an authentication service 206. Information related to the permission request is presented to the user. The information may be presented visually on a screen, audibly by text-to-voice applications, or by other methods. The mobile device 208 is configured to receive sensory input from the user to determine the permission response. Sensory input includes tactile input (e.g., pushing a button), verbal input, or kinds of input. The mobile device 208 then sends the permission response to the authentication service 206. The mobile device 208 also is configured to receive sensory input from the user to automate the permission response as discussed herein.

As previously noted, the exemplary methods and systems discussed herein have focused on login actions to a web site. However, the authentication methods and systems described can be applied to any situation where access or actions need to be authenticated over a computer network. For example, an embodiment of one method can improve vehicular security by using the location awareness of the vehicle itself and including it as a component in an authentication request. The mobile device will not grant the permission request unless it and the vehicle are in close proximity to each other. Another embodiment can include transaction verification, such as providing a means for credit card processors to verify all or a subset of credit card transactions.

Furthermore, physical access controls can be augmented by only allowing access if a paired mobile device is in proximity to the point of entry. Such access controls can further be improved by using this method as a means for authorization, where one or more additional paired devices must approve a request for entry to be granted, for example, a maintenance worker attempting to enter a plant floor may request entry along with a work order, which is transmitted to a plant manager's mobile device for explicit approval before access is granted.

The methods and systems of authentication described herein may also be paired with other more secure factors of authentication. For example, a biometric authentication factor (e.g., a retinal scan, a fingerprint, a voice profile, etc.) may be required in concert with a permission response from the mobile device for those applications requiring heightened security, such as military field operations. Security increases exponentially with each added layer of authentication.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Furthermore, the flow charts depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

The invention claimed is:

1. A method of authentication/authorization, comprising:
   receiving an authentication request from an authenticating service system to verify an action to be performed on behalf of a user based on an authentication/authorization process using at least one mobile device;
   sending a permission request to said at least one mobile device associated with said user to grant or deny permission to perform said action, wherein said at least one mobile device is paired with said authenticating service system;
   sending a permission response from said at least one mobile device to said authenticating service system, wherein said permission response can be generated manually or automatically;
   enabling said user to select a feature to automate said permission response to allow said user to eliminate a need to manually grant or deny any future permission request for said action, wherein said future permission requests meet at least one automation criterion; and
   automating said permission response to said future permission requests without prompting said user to grant or deny said future permission requests if said user has selected said feature to automate.

2. The method of claim 1, further comprising prompting said user to grant or deny said future permission requests if said at least one automation criterion is not met or if said user has not selected said feature to automate.

3. The method of claim 1, wherein information determining whether said at least one automation criterion is met is stored on said at least one mobile device.

4. The method of claim 1, wherein said at least one criterion comprises proximity of said at least one mobile device to a geographic location.

5. The method of claim 1, wherein said at least one criterion comprises proximity of said at least one mobile device to one of a plurality of geographic locations.

6. The method of claim 1, wherein said action comprises logging on to a web site of said authenticating service system.

7. The method of claim 1, wherein said action comprises a critical action as defined by said authenticating service system.

8. The method of claim 1, wherein said action comprises a transfer of funds.

9. The method of claim 1, further comprising pairing said at least one mobile device with said authenticating service system.

10. The method of claim 9, wherein said pairing comprises establishing a shared secret between said at least one mobile device and said authenticating service system.

11. The method of claim 10, wherein permission response includes a one-time password.

12. The method of claim 9, wherein said pairing comprises establishing a unique pairing identifier between said at least one mobile device and said authenticating service system, said authentication request being automatically denied if said pairing identifier is not present with said authentication request.

13. The method of claim 1, further comprising pre-seeding said permission response when said at least one automation criterion changes states.

14. The method of claim 1, wherein said permission request comprises a designator of said authenticating service system, an action description, a user name, a terminal description.

15. A system for authentication/authorization, comprising:
    at least one processor;
    at least one memory element storing instructions for controlling said at least one processor to perform steps comprising:
       receiving an authentication/authorization request from an authenticating service system to verify an action to be performed on behalf of a user based on an authentication/authorization process using at least one mobile device;
       sending a permission request to said at least one mobile device associated with said user to grant or deny permission to perform said action, wherein said at least one mobile device is paired with said authenticating service system;
       sending a permission response from said at least one mobile device to said authenticating service system, wherein said permission response can be generated manually or automatically;
       enabling said user to select a feature to automate said permission response to allow said user to eliminate a need to manually grant or deny any future permission request for said action, wherein said future permission requests meet at least one automation criterion; and
       automating said permission response to said future permission requests without prompting said user to grant or deny said future permission requests if said user has selected said feature to automate.

16. The system of claim 15, wherein information determining whether said at least one automation criterion is met is stored on said at least one mobile device.

17. A non-transitory computer-readable medium including one or more sequences of instructions which, when executed by one or more processors, causes said one or more processors to perform the steps comprising:
    receiving an authentication/authorization request from an authenticating service system to verify an action to be performed on behalf of a user based on an authentication/authorization process using at least one mobile device;

sending a permission request to said at least one mobile device associated with said user to grant or deny permission to perform said action, wherein said at least one mobile device is paired with said authenticating service system;

sending a permission response from said at least one mobile device to said authenticating service system, wherein said permission response can be generated manually or automatically;

enabling said user to select a feature to automate said permission response to allow said user to eliminate a need to manually grant or deny any future permission request for said action, wherein said future permission requests meet at least one automation criterion; and automating said permission response to said future permission requests without prompting said user to grant or deny said future permission requests if said user has selected said feature to automate.

18. The non-transitory computer-readable medium of claim 17, wherein information determining whether said at least one automation criterion is met is stored on said at least one mobile device.

19. A mobile device for authenticating/authorizing a permission request from an authenticating service system, said mobile device including a processor and operable to perform operations comprising:

receiving a permission request from an authentication service system after an authentication/authorization request has been received by said authentication service system to verify an action to be performed on behalf of a user based on an authentication/authorization process using said mobile device;

presenting information related to said permission request, wherein said mobile device is paired with said authenticating service system;

receiving sensory input from a user to determine a permission response;

sending said permission response from said mobile device to said authentication service terminal, wherein said permission response can be generated manually or automatically; and receiving sensory input from a user that selects whether to automate a permission response for future permission requests when at least one automation criterion is met, such that future permission responses do not require sensory input from said user to eliminate a need to manually grant or deny any future permission requests for said action, wherein information necessary to determine whether said at least one automation criterion is met is stored on said mobile device.

* * * * *